United States Patent [19]

Wachala et al.

[11] 3,990,905

[45] Nov. 9, 1976

[54] FOOD PROCESS ANTIFOAM

[75] Inventors: Raymond J. Wachala; Ralph E. Svetic, both of Chicago, Ill.

[73] Assignee: Nalco Chemical Company, Oak Brook, Ill.

[22] Filed: Feb. 9, 1976

[21] Appl. No.: 656,238

[52] U.S. Cl. .................................. 127/44; 127/42; 252/321
[51] Int. Cl.² .................... B01D 19/04; C13D 1/08
[58] Field of Search ................ 127/42, 44; 252/321

[56] References Cited
UNITED STATES PATENTS

| | | | |
|---|---|---|---|
| 2,871,148 | 1/1959 | Kent | 127/58 |
| 3,231,508 | 1/1966 | Lew | 252/152 |
| 3,595,695 | 7/1971 | Langen | 127/5 |
| 3,673,105 | 6/1972 | Curtis | 252/321 |
| 3,746,576 | 7/1973 | Schneider | 127/5 X |
| 3,923,683 | 12/1975 | Michalski | 252/321 |

OTHER PUBLICATIONS

Sugar Industry Abstracts, vol. 23, Abs. 229, 1961.
Sugar Industry Abstracts, vol. 33, Abs. 627P, 1971.
Sugar Industry Abstracts, vol. 34, Abs. 905P, 1972.

Primary Examiner—Morris O. Wolk
Assistant Examiner—Sidney Marantz
Attorney, Agent, or Firm—John G. Premo; Robert A. Miller; Barry W. Sufrin

[57] ABSTRACT

A defoaming composition comprising a bis-amide, a liquid hydrocarbon oil, and optionally a surfactant having an HLB of at least 6. The composition may be used to abate and prevent foam formation in sugar beet raw liquor.

12 Claims, No Drawings

FOOD PROCESS ANTIFOAM

INTRODUCTION

Many commercial food processing operations result in the formation of unwanted foam which causes serious process difficulties. The presence of substantial amounts of foam in food processing operations may result in wastage and safety hazards due to foam-over, reduced processing rates and frequent unscheduled shut downs.

One food processing industry in which foaming is of considerable interest is the sugar beet processing industry. Some specific physical operations present in sugar beet processing which promote foam formation include: pumping of sugar beet liquor, agitation in various process steps, free fall of sugar liquor, addition of carbon dioxide gas to the sugar beet liquor and vacuum conditions to which the liquor is subjected.

The present disclosure is directed to an efficient and inexpensive antifoam composition which is effective and safe for use in all phases of sugar beet extraction as well as in other food processing operations.

OBJECTS

It is, therefore, an object of the present invention to provide a composition with significant antifoaming properties. A further object of the present invention is to provide such an antifoam composition useful, effective and safe for use in food processing.

Yet another object of the present invention is to provide an antifoam composition safe and effective for use in sugar beet processing. Another object of the present invention is to provide a composition useful in preventing foaming in sugar beet raw liquor, obtained by the extraction of sugar from sugar beets.

Another object of the present invention is to provide a method for abating and preventing the formation of foam in sugar beet raw liquor.

Further objects will appear hereinafter.

BACKGROUND

For purposes of illustration, the discussion herein will be directed toward the prevention of foaming in sugar beet processing. Briefly, this entails:

Washed sugar beets are brought into contact with beet-slicing mechanisms. These mechanisms are often horizontal axis, rotating drum slicers with serrated knives set in the periphery of the drum. The beets are sliced into cossettes by the beet-slicing mechanisms. Cossettes are long, thin strips, 2–3 mm thick and up to 15 cm long with a V-shaped or square cross section. The cossettes are then transferred into a diffuser for extraction of their sugar. Heated fresh and process water (65°–80° C) passes through the diffuser thereby contacting the cossettes and removing the sugar from the cossettes along with soluble impurities and some solids. As the water leaves the diffuser for further processing, it is termed "raw juice."

The raw juice is then purified, usually by the addition of lime and carbon dioxide gas. The mechanism of purification entails the formation of precipitates of insoluble impurities as well as the coagulation and adsorption of other impurities.

The purified juice is then gradually heated to drive off water thereby forming "thick juice" which is filtered to produce "standard liquor." The standard liquor is then boiled under vacuum, and crystal formation is promoted. Raw sugar crystals thus produced are separated from the mother liquor ("molasses"). The molasses are then usually de-sugared under the Steffen process. This process entails the dilution of the molasses with water, followed by cooling, addition of large amounts of lime and carbonation.

Foaming occurs during beet washing, during treatment in the diffuser, during the purification and evaporation processes, as well as during the Steffen process. Foaming problems are most significant in the diffuser, in the early purification processes and in the Steffen process. In order to enable efficient handling of sugar beet liquor, it is, therefore, necessary to employ anti-foaming agents at various points in this sugar beet process.

The control, prevention and destruction of foam produced in the extraction of sugar beets and in other food processing procedures has long been of considerable importance. Antifoaming agents commonly used in the past have included polypropylene glycol and vegetable oils. We have found a new antifoaming agent which is far superior to the antifoaming agents presently commonly employed in food processing.

THE INVENTION

In accordance with the invention, we have discovered that superior defoaming compositions may be afforded by blending together a minor amount of a bis-amide as hereinafter described and a liquid hydrocarbon oil. In a preferred embodiment of the invention, the composition also contains minor amounts of a surfactant which has an HLB of up to 18 and is dispersible in oil to the extent of at least 5% by weight. The HLB system is a scheme for categorizing emulsifying agents well known in the art. The HLB system is described in "The Atlas HLB System" of Atlas Chemical Industries Incorporated, copyright 1963.

APPLICATION

A small amount of the composition of this invention will inhibit foam formation in food processing operations. In sugar beet processing, useful dosages range between 100–3000 ppm based upon the weight of sugar beet liquor being treated. In other food processing operations, it is expected that at least 25 ppm of the present antifoam composition based upon the weight of the liquid being treated will be required.

The composition may be added at or prior to any point in the food processing operation at which foaming problems might arise. In sugar beet processing, for example, the antifoam composition may be added at any point running from the washing of the sugar beets to the crystallization of the raw sugar or the desugaring of the molasses.

Finally, it should be noted that the antifoam composition disclosed herein will be useful when utilized in combination with other antifoam compositions. When used in combination with other antifoams, both improved antifoam activity and a reduction in the total amount of antifoam required is predicted. The determination of optimal dosages will vary depending upon the properties of the other antifoam compositions.

THE BIS-AMIDE

The bis-amides which may be used in this invention are of the following structure:

$$R-\overset{O}{\underset{\|}{C}}-\overset{H}{\underset{|}{N}}-(CH_2)_n-\overset{H}{\underset{|}{N}}-\overset{O}{\underset{\|}{C}}-R$$

where:
$n$ is an integer from 1–6; and
R is a saturated or unsaturated, stright or branched chain aliphatic group having from 5–22 carbon atoms.

Preferably, $n$ is 2 and R is from 12–22 carbon atoms and is a saturated hydrocarbon group. A typical preferred compound is ethylene-bis-stearamide.

Stabilization increases with increasing chain lengths. Typical saturated bis-amides which can be employed in this invention are listed below:
methylene bis caprylamide
methylene bis pelargonamide
ethylene bis capramide
methylene bis lauramide
methylene bis myristamide
methylene bis palmitamide
methylene bis stearamide
ethylene bis arachidamide
ethylene bis behenamide Typical unsaturated amides which can be employed in this invention are listed below:
hexylene bis linolenamide
propylene bis linoleamide
propylene bis oleamide
pentylene bis brucamide

THE SURFACTANTS

As indicated, the surfactants used in a preferred practice of the invention are combined with the bis-stearamide and the hydrocarbon oil to provide an amount ranging from 0.1–30% by weight and preferably 5–15% by weight of the total composition.

Although the action of the surfactant is not fully understood, its inclusion enhances distribution of the bis-amide throughout the system to be defoamed. This improved distribution occurs either by a mechanism of emulsification or by a more subtle phenomena which we term "spreading." By using the surfactant in combination with the bis-amide and the hydrocarbon oil, it is possible to substantially reduce the amount of bis-amide required to defoam a particular system.

The surfactants may be more specifically described in that they have an HLB of up to 18 with preferred surfactants having an HLB within the range of 5–18.

The surfactants that may be used may be chosen from a large number of known surfactants falling within the limitations set forth above. In order to be compatible with most systems, it is necessary that they be dispersible in the hydrocarbon oil used to prepare the composition of the invention and soluble to the extent of at least 5% by weight or more in the hydrocarbon oil.

Since our compositions find their greatest utility in the defoaming of sugar beet processing systems, it is desirable that one select a relatively non-toxic surfactant. Illustrative of such surfactants are:
Oleic acid derived from tall oil fatty acids
Polyoxyethylene (600) dioleate
Polyoxyethylene (600) monoricinoleate
Polypropylene glycol
Soybean oil fatty acids, hydroxylated
Tallow, hydrogenated or oxidized
Tallow alcohol, hydrogenated
n-Butoxypolyoxyethylene polyoxypropylene glycol
Polyethylene glycol
Polyoxyethylene 40 monostearate
Calcium stearate
Fatty acids
Hydroxylated lecithin
Magnesium stearate In the broader aspects of our invention, other surfactants may be used. Typical of such surfactants are those described in Columns 3 and 4 of U.S. Pat. No. 3,408,306 which compounds are set forth below:

The surfactant may be anionic, cationic or nonioic. Examples of suitable anionic emulsifiers are alkali metal, ammonium and amine soaps; the fatty acid part of such soaps contains preferably at least 16 carbon atoms because soaps based on lauric and myristic acids have a great tendency to develop abundant foam. The soaps can also be formed "in situ;" in other words, a fatty acid can be added to the oil phase and an alkaline material to the aqueous phase.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10–15 molecules of ethylene oxide, mannitan monopalmitate reacted with 10–15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

It is helpful for purposes of rapidly distributing the compositions of this invention into various aqueous food processing systems that the particular surfactant has the ability to emulsify the composition into the system being treated to produce an oil-in-water emulsion which contains the bis-amide. To accomplish this goal, it is sometimes necessary to blend one or more surfactants to achieve emulsification in conjunction with spreading.

EMULSIFIER TYPE SURFACTANTS

In a preferred embodiment of our invention, we prefer to use as surfactant emulsifiers certain fatty acid esters and soaps.

Fatty acid esters useful as emulsifying agents in the composition of the invention are the fatty acid esters of polyoxy alkylene glycols which include polyoxy ethylene glycols, polyoxy propylene glycols as well as esters of mixed copolymers of ethylene oxide and propylene oxide. These esters may be mono- or di- fatty acid esters. Examples of the fatty acids that may be used to prepare these esters include fatty acids which are from 12 to about 22 carbon atoms in chain length. These fatty acids are preferably from 12–18 carbon atoms in chain length. While pure fatty acids may be used as starting materials to prepare these esters, mixed fatty acids which are derived from animal fats and vegetable oils may also be used. Illustrative pure fatty acids include lauric, myristic and oleic; illustrative mixed fatty acids include palmitic, coco and tallow.

The polyoxy alkylene glycols used in preparing these esters should have a molecular weight of at least 400. When polyoxy ethylene glycol polymers are used, the molecular weight is preferably within the range of 400–600. As indicated, the fatty acids may be reacted with these polymers or the fatty acids may be reacted with ethylene oxide to form the polymers by means of a simple reaction.

Illustrative of polymers of this type are: oleic acid mono-ester of polyethylene glycol having a molecular weight of 400; stearic acid di-ester of a polyoxy ethylene glycol having a molecular weight of 600.

Another group of fatty acid esters that may be used are the fatty acid esters of the so called block copolymers which polymers are prepared by ethoxylating certain polyoxy propylene glycols. Both the molecular weight of the starting polypropylene glycol and the amount of ethylene oxide which is reacted therewith may be varied to produce the block copolymers. The particular block copolymers that are most effective in the practice of the invention have molecular weights ranging from 1500–4000. The fatty acids are the same as those previously described in relationship to the mono- and di-esters of the polyoxy ethylene glycols. For a more detailed description of these polyoxy propylene polymers, see U.S. Pat. No. 2,674,619 which is incorporated herein by reference.

Fatty acid soaps which may be used as emulsifying agents include alkaline earth salts, e.g. calcium, manganese, barium stannate salts of those fatty acids previously described. Typical fatty acid soaps are calcium stearate, barium oleate and the calcium salts of coco or tallow acids.

SPREADING AGENT TYPE SURFACTANTS

When it is desirable to prepare bis-amide compositions used in defoaming sugar beet processing units and processes, we prefer to use in combination with the "emulsifier type" surfactants certain "spreading agent" surfactants which may be classified as polyoxyalkylene glycols. This class of materials are prepared by the random copolymerization of ethylene oxide and propylene oxide. They preferably have a molecular weight well within the range of 1200–2400. These materials as well as their mode of preparation are described in "Technology of the Polyethylene Glycols and Carbowax Compounds" which appeared in the Feb. 10, 1945 issue of *Chemical and Engineering News* at pages 247–251.

In addition to using the polyoxyalkylene glycol polymers described above, it is possible to substitute therefore certain branched chained alcohols which have been ethoxylated with from 2 up to 10 moles of ethylene oxide. Examples of such alcohols include: polypropylene glycol of molecular weight 1200–2400 -ethoxylated with 1–4% by weight of ethylene oxide per mole of polypropylene glycol, Tergitol S surfactants* 15-S-3, 15-S-5 and 15-S-7 and similar ethoxylated propoxylated linear alcohols in the molecular weight range 150–600.

*These are products of Union Carbide described in the manufacturer's literature as nonionic ethoxylated isomeric linear alcohols obtained from petroleum hydrocarbons containing a linear alkyl hydrophobic portion comprising a mixture of $C_{11}-C_{15}$ linear chains and a hydrophilic portion comprising a polyoxyethylene chain randomly attached to the linear aliphatic chain through ether linkages. The molecular weight of these Tergitols is in the range of 330–510 and their structural formula is shown as:

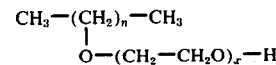

where: x = 3 for 15-S-3 x = 5 for 15-S-5 x = 7 for 15-S-7

THE HYDROCARBON OIL

Illustrative examples of hydrocarbon oils include odorless light petroleum hydrocarbons comprising mixtures of liquid hydrocarbons derived from petroleum or synthesized from petroleum gases where the mixture is chiefly paraffinic, isoparaffinic or naphthelinic in nature. These hydrocarbon mixtures should meet the following FDA specifications (21CFR 121.1182):

| | |
|---|---|
| (1) | Odor is faint and not kerosenic. |
| (2) | Initial boiling point is 300° F minimum. |
| (3) | Final boiling point is 650° F maximum. |
| (4) | Ultraviolet absorbance limits determined by method specified in §121.2589 (b) (l) (ii), as follows: |

| Wavelength | Maximum Absorbance per Centimeter Optical Pathlength |
|---|---|
| Mµ | |
| 280–289 | 4.0 |
| 290–299 | 3.3 |
| 300–329 | 2.3 |
| 330–360 | 0.8 |

Hydrocarbon oils satisfying these specifications are termed "substantially non-toxic mineral oils" for purposes of the present disclosure.

PREFERRED EMBODIMENT

A particularly generalized formula that may be used in defoaming a variety of industrial food processing operations consists of ethylene-bis-stearamide in an amount ranging from 0.1–10% in a mineral aliphatic hydrocarbon oil which is substantially non-toxic and has been approved by the Food and Drug Administration as a food type additive or for medicinal purposes.

In a preferred embodiment, the antifoam composition contains 0.1–10% by weight of ethylene-bis-stearamide, 0–15% by weight of a water-insoluble fatty acid ester derived from edible fats and oils, and the remainder paraffin or isoparaffin oil. In a more preferred embodiment, the antifoam composition contains 2–5% of the ethylene-bis-stearamide, 5–10% of the fatty acid ester and the remainder isoparaffin oil. A preferred fatty acid ester is polyethylene glycol (molecular weight 400–600) dioleate. In a most preferred embodiment, the antifoam will contain, in addition to the amide, the ester and the hydrocarbon oil, up to 15% by weight of Tergitol 15-S-7.

EXAMPLES 200 cc of raw juice was placed in a 1 liter graduated cylinder and maintained at 65–75° C by immersion in a water bath. Air was bubbled into the sample through a sparger ball at a fixed rate of 400 cc/minute.

The antifoaming compositions being tested were added in increments to the raw juice prior to sparging until that dosage was obtained which completely prevented foam formation after 3 minutes of sparging. The antifoam compositions tested and their performance of these sparging tests are recorded in Table I below.

several common commercially available antifoam compositions, the antifoam compositions of our invention have exhibited consistently superior antifoam activity.

The examples above are set forth for purposes of illustration and are not intended to limit the scope of the present invention.

We claim:
1. An antifoam composition consisting essentially of 0.1–10% by weight of a bis-amide having the structure

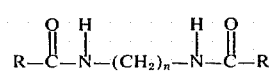

where:
 $n$ is an integer from 1–6; and
 R is a saturated or unsaturated, straight or branched chain aliphatic group having from 5–22 carbon atoms; and the remainder of the composition being a liquid hydrocarbon oil.
2. An antifoam composition consisting essentially of 0.1–10% by weight of ethylene-bis-stearamide, with the remainder being a substantially non-toxic mineral oil.
3. An antifoam composition consisting essentially of 0.1–10% by weight of ethylene-bis-stearamide, 0.1–30% by weight of a surfactant with HLB of up to 18

TABLE 1

ANTIFOAM COMPOSITION TESTS (COMPOSITION IN PERCENTAGE BY WEIGHT)

| COMPOSITION NO. | ISOPARAFFIN OIL | POLYPROPYLENE GLYCOL (MW 2000) | ETHOXYLATED POLYPROPYLENE GLYCOL | TERGITOL S TYPE SURFACTANTS | POLYETHYLENE GLYCOL (MW 400-600) DIOLEATE | ETHYLENE BIS-STEARAMIDE | OTHER | DOSAGE (PPM) | ACTIVITY |
|---|---|---|---|---|---|---|---|---|---|
| 1 | 87.75 | | | | 10 | 2.25 | | 750 | Foaming completely inhibited for 3 minute test period |
| 2 | 86.85 | | | | 10 | 2.25 | 0.9 Hydrophobic Silica | 600 | Foaming completely inhibited for 3 minute test period |
| 3 | 77.75 | 10 | | | 10 | 2.25 | | 400 | Foam height level at 700 cc on 1000 cc graduate |
| 4 | 77.75 | | 10 | | 10 | 2.25 | | 400 | Foam height level at 700 cc on 1000 cc graduate |
| 5 | 77.75 | | | 10 | 10 | 2.25 | | 400 | Foaming completely inhibited for 3 minute test period |
| 6 | 77.75 | 5 | 5 | | 10 | 2.25 | | 400 | Foaming completely inhibited for 3 minute test period |
| 7 | 77.75 | 5 | | 5 | 10 | 2.25 | | 400 | Foaming completely inhibited for 3 minute test period |
| 8 | 77.75 | | 5 | 5 | 10 | 2.25 | | 400 | Foaming completely inhibited for 3 minute test period |
| 9 | 72.75 | 5 | 5 | 5 | 10 | 2.25 | | 400 | Foam height level at 400 cc on 1000 cc graduate |
| 10 | 87.75* | | | | 10 | 2.25 | | 1500 | Foaming completely inhibited for 3 minute test period |
| 11 | 63.0 | 15 | | 10 | 5 | | 7 Oleic Acid | 2100 | Foaming completely inhibited for 3 minute test period |

*Paraffin oil was used instead of isoparaffin oil.

Analysis of the data in Table I shows that formulations containing ethylene-bis-stearamide exhibit outstanding defoaming activity. Further empirical study has shown compositions formulated along the lines of our disclosure to be economical and to have very good physical stability. Finally, in comparative testing with which is oil dispersible to the extent of at least 5% by weight, with the remainder being a liquid hydrocarbon oil.

4. An antifoam composition consisting essentially of 0.1–10% by weight of ethylene-bis-stearamide, 0.1–30% by weight of a surfactant with HLB between 5–18 which is oil dispersible to the extent of at least 5% by weight, with the remainder being a liquid hydrocarbon oil.

5. The antifoam composition of claim 4 where the surfactant is capable of producing a water-in-oil emulsion of the ethylene-bis-stearamide.

6. An antifoam composition consisting essentially of 0.1–10% by weight of a bis-amide having the structure

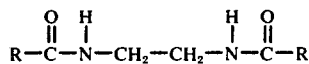

where:
R is a saturated or unsaturated, straight or branched chain aliphatic group having from 5–22 carbon atoms;
0–15% by weight of a compound selected from the group consisting of water-insoluble fatty acid esters, fatty acids, and salts of fatty acids derived from edible fats and oils;
0–15% of an ethoxylated propyoxylated alcohol; and the remainder of the composition being a liquid hydrocarbon oil.

7. The antifoam composition of claim 6 wherein the bis-amide is ethylene-bis-stearamide.

8. A method for abating and preventing foam formation in sugar beet raw liquor comprising adding to the sugar beet raw liquor from 100–3000 ppm by weight of the antifoam composition of claim 1.

9. A method for abating and preventing foam formation in sugar beet raw liquor comprising adding to the sugar beet raw liquor from 100–3000 ppm by weight of the antifoam composition of claim 2.

10. A method for abating and preventing foam formation in sugar beet raw liquor comprising adding to the sugar beet raw liquor from 100–3000 ppm by weight of the antifoam composition of claim 3.

11. A method for abating and preventing foam formation in sugar beet raw liquor comprising adding to the sugar beet raw liquor from 100–3000 ppm by weight of the antifoam composition of claim 6.

12. The method of claim 11 wherein the antifoam composition is added to the sugar beet raw liquor at the diffuser.

* * * * *